United States Patent [19]

Porter

[11] 4,213,331
[45] Jul. 22, 1980

[54] SURFACE IRREGULARITY ANALYZER

[75] Inventor: John P. Porter, Cuyahoga Falls, Ohio

[73] Assignee: The B. F. Goodrich Company, Akron, Ohio

[21] Appl. No.: 971,577

[22] Filed: Dec. 20, 1978

[51] Int. Cl.$^3$ .............................................. G01B 5/28
[52] U.S. Cl. .................................................... 73/105
[58] Field of Search .................. 73/105, 104, DIG. 11

[56] References Cited

U.S. PATENT DOCUMENTS

| | | | |
|---|---|---|---|
| 2,240,278 | 4/1941 | Abbott | 73/105 |
| 2,961,871 | 11/1960 | Ricks | 73/105 |
| 3,061,732 | 10/1962 | Milnes | 73/DIG. 11 UX |
| 3,208,272 | 9/1965 | Hall, Jr. et al. | 73/105 |
| 4,084,324 | 4/1978 | Whitehouse | 73/105 |
| 4,103,542 | 8/1978 | Wheeler et al. | 73/105 |

Primary Examiner—Jerry W. Myracle
Attorney, Agent, or Firm—James R. Lindsay

[57] ABSTRACT

Briefly, the invention comprehends an apparatus and method for measuring the surface characteristics of a specimen with improved accuracy and facility than was heretofore possible. Fundamentally, the apparatus includes a precision transducer positionable in direct engagement with a specimen for feeling the surface of the latter, a specimen support for supporting a specimen in proximity to such transducer, a motion mechanism for effecting relative movement between the specimen and transducer so that the latter effectively scans the surface of the former, and electric circuitry for analyzing information from the transducer and producing output information indicative of the surface characteristics of the specimen. According to the method of the invention, the surface characteristics of a specimen are measured by effecting relative movement, preferably of a scanning type, of a specimen with respect to a precision transducer and converting the information obtained from such transducer into output information directly respresentative of the surface characteristics of the specimen.

46 Claims, 5 Drawing Figures

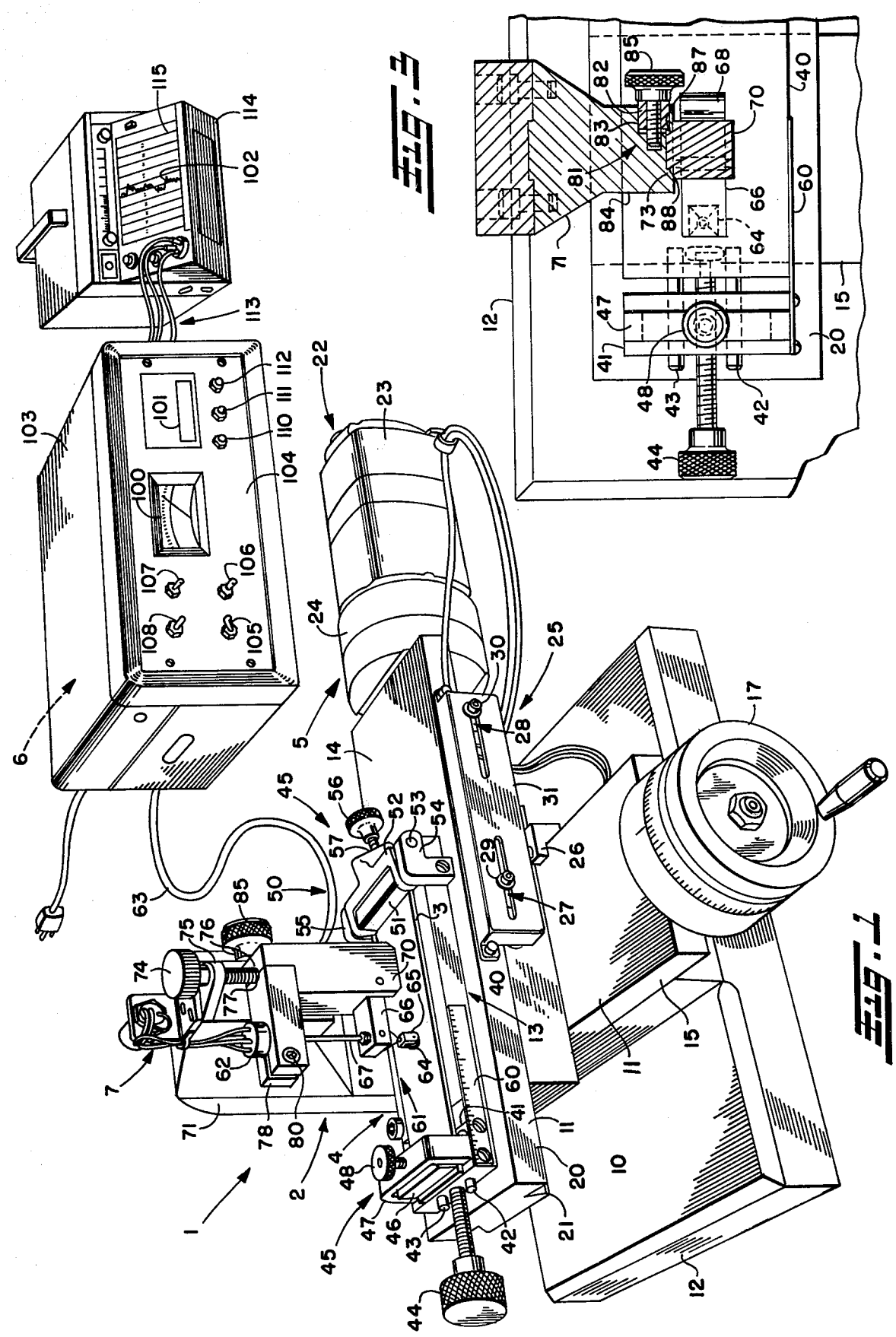

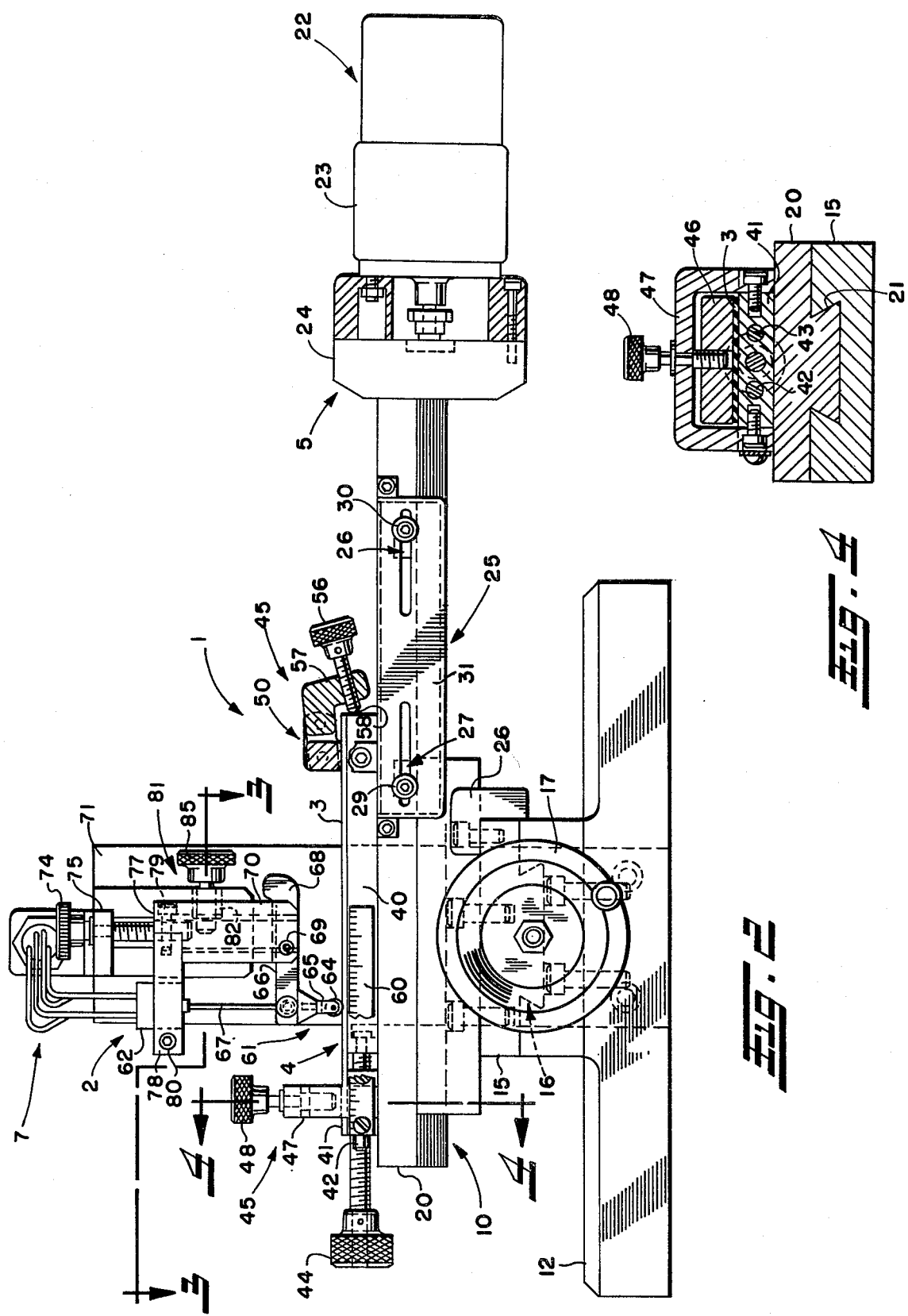

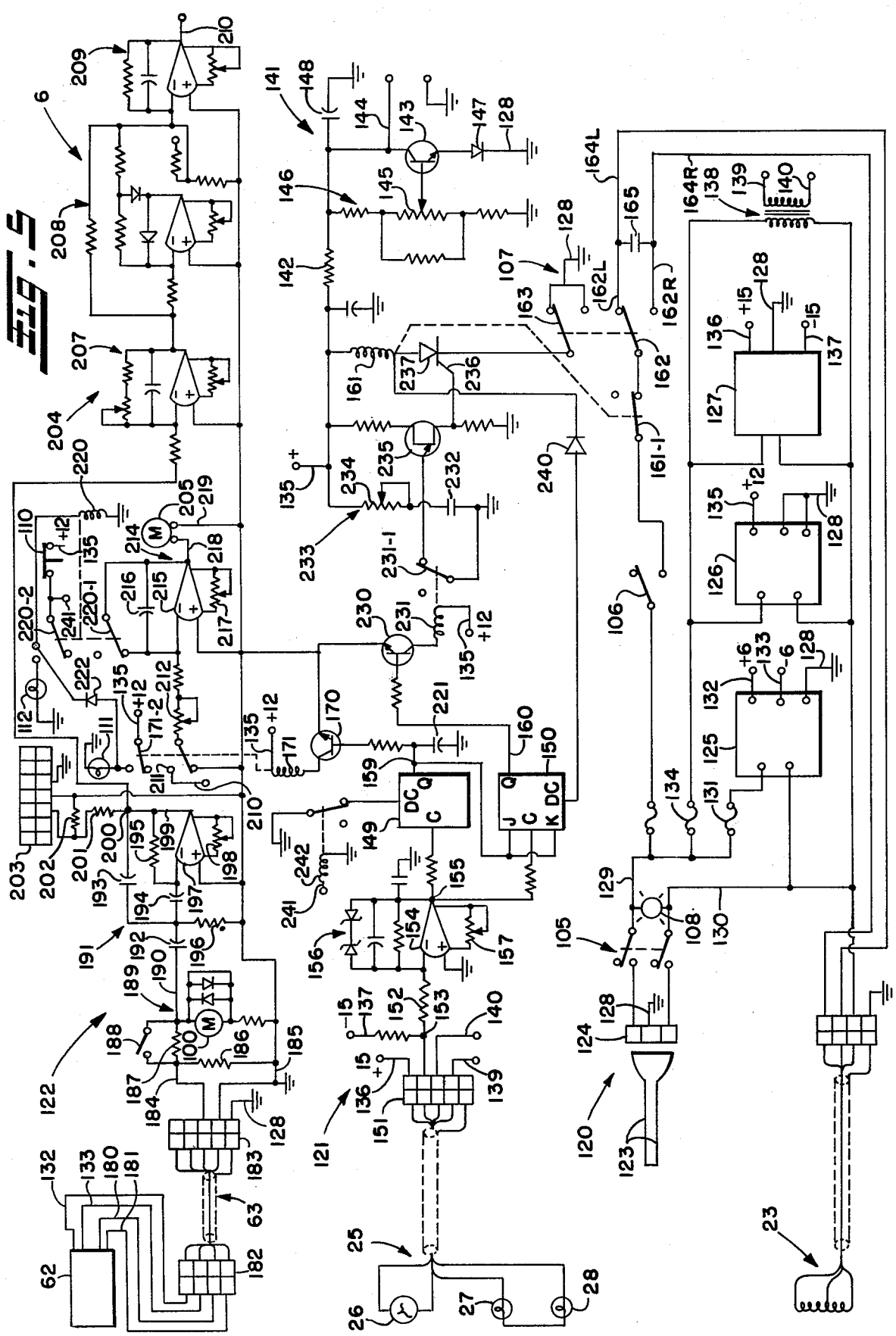

SURFACE IRREGULARITY ANALYZER

BACKGROUND OF THE INVENTION

The present invention generally relates to a method and apparatus for obtaining information concerning the surface characteristics of a specimen and describes more particularly such method and apparatus as applied to measuring carbon black dispersion in rubber. The dispersion of carbon black in rubber or other elastomeric material is an indication of the quality, such as uniformity and mechanical properties, of rubber and other elastomeric materials. The level of dispersion, the spacial arrangement of the carbon black agglomerates per unit volume, and the size of each agglomerate are important factors considered in evaluating such quality. In one prior technique for measuring surface roughness of rubber as an indication of carbon black dispersion therein, the resistance to flow of air between the tested surface and a plane test surface resting thereon was measured using a Rugosimeter. In another prior technique, carbon black dispersion was measured using the Ameda System which includes a microscope, a photosensor, a scan drive apparatus to move various portions of a specimen into view of the microscope and photosensor, and substantial complex electronic circuitry for evaluating the photosensor response as it "viewed" the specimen. In the former technique the results obtained from any measurement represents an average value and lacks a certain degree of accuracy; and in the latter technique the time require to effect the necessary sample preparation, sample viewing, and signal analysis is extremely lengthy and the equipment for effecting the same extremely expensive.

In the past a diamond stylus has been used to detect the microstructure of a sample. In the present invention, however, it is the macrostructure, not the microstructure, that is to be sensed and converted to useful information representing carbon black dispersion in a specimen. Accordingly, in the present invention a rolling contact is made with the specimen to facilitate scanning of the specimen and gathering of information concerning the surface characteristics thereof.

SUMMARY OF THE INVENTION

Briefly, the invention comprehends an apparatus and method for measuring the surface characteristics of a specimen with improved accuracy and facility than was heretofore possible. Fundamentally, the apparatus includes a precision transducer positionable in direct engagement with a specimen for feeling the surface of the latter, a specimen support for supporting a specimen in proximity to such transducer, a motion mechanism for effecting relative movement between the specimen and transducer so that the latter effectively scans the surface of the former, and electric circuitry for analyzing information from the transducer and producing output information indicative of the surface characteristics of the specimen. According to the method of the invention, the surface characteristics of a specimen are measured by effecting relative movement, preferably of a scanning type, of a specimen with respect to a precision transducer and converting the information obtained from such transducer into output information directly representative of the surface characteristics of the specimen. In accordance with the preferred embodiment of the invention, the apparatus and method include means for and the step of stretching the specimen to accentuate certain characteristics therein and means for and the step of analyzing the transducer information to eliminate relatively low and high frequency signals and thus retaining only mid-range frequency signals indicative specifically of particulate or agglomerate dispersion in the specimen. Additional features of the invention include the precision transducer for detecting the macromolecular surface roughness or smoothness characteristic of a specimen, a clamp for clamping a specimen on the support, and electrical measuring, integrating, and control circuitry. The control circuitry, for example, controls automatic relative movement of the specimen and transducer to effect the desired scanning.

The invention will be described in detail below with reference particularly to its use in testing or measuring carbon black dispersion in rubber or other elastomeric material. However, it will be appreciated that the invention may be employed for testing other characteristics of other specimens, such as the quality of a latex roll coating, by measuring the surface characteristics thereof.

The surface irregularity analyzer of the present invention provides information with a higher degree of accuracy than the aforesaid air flow technique and in an appreciably shorter time, e.g. in minutes rather than hours, than the aforesaid optical technique.

With the foregoing in mind, it is a primary object of the present invention to provide an improved apparatus and method for measuring the surface characteristics of a specimen.

Another object is to provide an improved carbon black dispersion tester and a method for measuring carbon black dispersion.

An additional object is to improve the accuracy and to expedite the taking of measurements of the surface characteristics of a specimen.

A further object is to facilitate uniform, non-destructive stretching of a specimen.

Still another object is to provide accurate control for automatic scanning in an apparatus for measuring the surface characteristics of a specimen.

Still an additional object is to provide improved signal analysis for information developed in analyzing the surface characteristics of a specimen.

Even another object is to expedite quality control of a product by examining carbon black dispersion in a specimen.

These and other objects and advantages of the present invention will become more apparent as the following description proceeds.

To the accomplishment of the foregoing and related ends, the invention, then, comprises the features hereinafter fully described in the specification and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 1 is a perspective view of a surface irregularity analyzer in accordance with the present invention;

FIG. 2 is a side elevation view, partly broken away in section, of the apparatus with the support portion thereof in a relatively extreme right-hand position;

FIG. 3 is a section view of the apparatus through a portion of the transducer stand looking generally in the direction of the arrows 3—3 of FIG. 2;

FIG. 4 is a section view through the movable end of the specimen support looking generally in the direction of the arrows 4—4 of FIG. 2; and FIG. 5 is a schematic electric circuit diagram of the electrical circuitry for controlling the apparatus and for analyzing the transducer signal information therefrom.

DESCRIPTION OF THE PREFERRED EMBODIMENT

Referring now in detail to the drawings, wherein like reference numerals designate like parts in the several figures, and initially to FIGS. 1 and 2, a surface irregularity analyzer in accordance with the present invention is generally indicated at 1. Fundamentally the apparatus is an electro-mechanical assembly including a sample holder for a specimen, a traversing mechanism which includes a motorized miniature lathe bed, and a sensor system which is in direct mechanical engagement with the specimen. Output circuitry responsive to the sensor system preferably develops a digital number that relates to surface roughness. More particularly, the analyzer 1 includes a transducer or sensor 2 for sensing perturbations in the surface of a specimen 3, a support 4 for supporting the specimen in position to be directly mechanically engaged by the transducer, a motion mechanism 5 for effecting relative movement between the specimen and the transducer, and electrical circuitry 6 (FIGS. 1 and 5) responsive to transducer signals from the transducer, for example on cable leads 7, to produce output information indicative of the surface characteristics of the specimen 3.

According to the method of the invention, a specimen (for example, a carbon black-reinforced rubber specimen) is tested by mechanically scanning the same with a transducer that is directly mechanically engaged with the specimen to produce transducer signals indicating the surface characteristics of discrete surface portions of the specimen. The transducer signals are analyzed or processed to eliminate irrelevant portions thereof and, then, to produce output information representing the surface characteristics of a scanned portion of the specimen.

The support 4 includes a lathe bed 10, which has a slide table 11 that is movable with two degrees of freedom in perpendicular directions relative to a base 12, and a two-part platen 13 on the top 14 of the slide table 11. A lower table portion 15 of the slide table 11 is mounted on the base 12 by a conventional dovetail shape connection 16 and may be moved with respect to the base in the direction perpendicular to the plane of the drawing of FIG. 2, for example, by manually rotating a wheel 17 in conventional manner. The upper table portion 20 of the slide table 11 is similarly coupled to the lower table portion 15 by a further dovetail shape connection 21 and may be moved with respect to the lower table portion 15 and, thus, with respect to the base 12, in a direction parallel to the plane of the drawing of FIG. 2.

The motion mechanism 5 includes the wheel 17 and appropriate hardware that effects movement of the lower table portion 15 of the slide table 11 and, to move the upper table portion 20, a powered mover 22, which in the preferred embodiment is a synchronous electric motor 23, such as a Multirange Gearmotor manufactured by Ceartronics Corporation, Billerica, Mass., for accurate control of such movement and a transmission assembly 24, which preferably is of the spur gear type. The motor 23 and the transmission assembly 24 are directly connected to the upper table portion 20 for support thereby and the output drive shaft, not shown, of the transmission assembly 24 is connected directly to the conventional lead screw of the upper table portion 20 for rotating such screw to effect movement of the upper table portion.

The electrical circuitry 6 controls delivery of an AC energizing signal to the motor 23 to determine when the motor is energized and its rotational direction to obtain corresponding directional movement of the upper table portion 20 of the table 11. Moreover, to establish the opposite limits of such movement of the upper table portion 20, an opto-electronic assembly 25 is used to provide limit signals indicating to the electrical circuitry 6 when the portion 20 has reached one or the other of its extreme limits of movement. Such opto-electronic assembly 25 includes a conventional photosensitive detector 26 and a pair of light sources 27, 28. The light sources 27, 28 are adjustably mounted by screws 29, 30 in a cover bracket 31, which is attached to the upper table portion 20. The physical distance between the light sources 27, 28 represents the distance the upper table portion 20 may slide, and that distance may be adjusted by loosening the screws 29, 30 and repositioning the light sources in the cover bracket 31. Each time light from one of the light sources impinges on the photosensitive detector 26, the latter produces a signal that is conveyed to the electrical circuitry 6, which deenergizes the motor 23 stopping movement of the upper table portion 20.

The two-part platen 13 of the support 4 includes a fixed plate 40 that is securely attached to the table top 14 and a slider plate 41 that is guided for linear movement over the table top 14 and with respect to the fixed plate 40 by a pair of metal dowels 42, 43. Such movement of the slider 41 is effected by rotating a tension screw 44. A specimen clamping assembly 45 includes a vertical clamp in the form of a clamping bar 46 movable vertically within a U-shaped frame 47, which is secured to the slider 41, according to the adjustment of a clamping screw 48. By tightening the screw 48 the clamping bar 46 is forced into tight engagement with the specimen 3 to secure the same to the slider 41. The specimen clamping assembly 45 also includes a pivotal clamp 50 having a pivoted clamping bar 51 also mounted in a pivotable U-shaped frame or bracket 52. The bracket 52 in turn is mounted for pivotal movement on a pin 53, which is held in a pair of angle supports 54, 55 that are securely attached to the plate 40. A pivot clamping screw 56 positioned in an offset extension 57 of the bracket 52 has an end 58 abutting an edge of the plate 40 so that by tightening on the screw 56 the bracket 52 is pivoted about the pin 53 to urge the pivoted clamping bar 51 into tight engagement with the specimen 3 clamping the latter fixedly to the plate 40. The pivotal clamp 50 facilitates applying a balanced clamping force to the specimen 3, thereby minimizing any damage to the latter, and, in addition, enables such clamping in a relatively confined space to avoid interference with the transducer or sensor 2.

With a specimen 3 of, for example about 3"×4" (or about 7½ cm×10 cm) clamped to the platen 13, the tension screw 44 may be turned to move the slider 41 away from the fixed plate 40 thereby stretching the specimen. It has been discovered that when testing for carbon black dispersion in a rubber or other elastomeric material, it is desirable to effect some degree of stretching to the specimen in order to accentuate surface perturbations due to agglomerated carbon black in the specimen; in accordance with the invention it has been discovered that from about several percent to 20% stretch is desirable for that purpose and according to the best mode about 10% stretch is most preferred. A conventional linear measuring scale 60 mounted on the slider 41 and movable therewith with respect to the plate 40 may be used to indicate the amount of stretch of a specimen as the tension screw 44 is turned.

The transducer or sensor 2 is an electromechanical device that converts linear mechanical displacement of a sensor head 61 to an electrical signal by a conventional linear variable differential transformer 62. That signal is delivered via leads 7 and cable 63 (FIG. 1) to the electrical circuitry 6. The sensor head 61 includes a miniature precision bearing 64 supported in a yoke 65 for rolling movement on the top surface of the specimen 3 as the latter is moved by the motion mechanism 5 with respect to the transducer 2. In turn, the yoke 65 is mounted in a pivot arm 66 and a rod 67, which also is connected to the pivot arm, is coupled to the transformer 62 as a linear extension of the sensor head 61 to transmit mechanical displacement of the latter to the transformer 62. The pivot arm 66 has a counter weight 68 at its end opposite that at which the sensor head 61 is mounted and the arm 66 is supported by a jeweled bearing 69, which minimizes friction, from an adjustable sliding clevis 70. The size of the counterweight 68 and the relative position of the jeweled bearing 69 assure that the sensor head 61 is nearly weightless when it abuts or engages the specimen 3 further to improve the accuracy of the sensor head in sensing surface perturbations in the specimen 3.

A stand 71, which is fixed to the base 12 supports the transducer 2. The stand 71 and the sliding clevis 70 are connected by a conventional dovetail shape connection 73 (FIG. 3) to permit vertical sliding movement of the clevis 70 with respect to the stand. Such sliding movement is effected by manually turning a height adjustment screw 74 threaded through a mount 75, which is fixed to the stand 71, and also is threaded into an opening 76 in the top 77 of the sliding clevis 70. A mounting block 78 securely fastened to the sliding clevis 70 by a pair of screws 79 provides a secure clamping hold of the linear variable differential transformer 62. By temporarily loosening a screw 80 the transformer 62 may be adjusted in the mounting block 78, as can be seen most clearly in FIG. 1.

By turning the height adjustment screw 74 the height of the sliding clevis 70 can be varied relative to the stand 71. In accordance with the preferred embodiment of the invention, for obtaining optimum accurate information concerning the surface characteristics of a specimen 3 and to keep the shaft 67 substantially vertical for maximum precision of the LVDT 62, the height adjustment screw 74 is turned to obtain a horizontal positioning of the pivot arm 66 so that its major extent is parallel to that of the specimen 3, thereby to place the minature precision bearing 64, yoke 65, and rod 67 substantially perpendicular or normal to the plane of the surface of specimen 3. Ordinarily, the linear variable differential transformer 62 is adjusted in the mounting block 78 to obtain a zero or other predetermined reference value transducer electrical signal output on leads 7 when the transducer 2 has been properly adjusted, as aforesaid.

To lock the sliding clevis 70 in a properly adjusted position, as aforesaid, a locking mechanism 81 is provided. Such locking mechanism includes a lock cylinder 82 positioned in a cylindrical recess 83 in the support arm portion 84 of the stand 71, and a lock screw 85, which passes through a bore in the lock cylinder 82 and is threaded into a threaded recess 86 in the support arm portion 84. The lock cylinder 82 has an edge 87 which extends through an opening provided to engage a portion of the dovetail member 88 of the sliding clevis 70. By tightening on the lock screw 85 the edge 87 of the lock cylinder 82 binds against the dovetail portion 88 of the sliding clevis 70 to lock the same in fixed position relative to the stand 71. Conversely, when the lock screw 85 is loosened, the vertical position of the sliding clevis 70 may be altered by turning the height adjustment screw 74, as aforesaid.

In operation of the analyzer 1 according to the method of the present invention, the wheel 17 is turned to move the support 4 from beneath the transducer 2, and a specimen 3, such as a rectangular piece of rubber material, is placed on the support 4 and is securely clamped in position by the specimen clamping assembly 45 and pivotal clamp 50. The tension screw 44 is turned to stretch the specimen a desired amount to accentuate perturbations in the surface.

With the specimen so mounted and the sensor head 61 preferably raised, the wheel 17 is turned to move the specimen beneath the transducer 2 such that, for example, the sensor head 61 is relatively proximate one of the edges of the specimen. The lock screw 85 is loosened, then, and the height adjustment screw 74 is turned to alter the vertical position of the sliding clevis 70 in order to obtain the aforesaid parallel positioning of the pivot arm 66 and normal positioning of the sensor head 61 and rod 67, both with respect to the surface of the specimen 3; when the transducer signal on leads 7 is at a zero or other predetermined reference value, such transducer adjustment is correct, and the lock screw 85 is tightened to lock the sliding clevis from further movement.

Electrical circuitry 6 is operated to energize the motor 23, which through the transmission 24 effects relative movement between the specimen 3 and transducer 2 by driving the upper table portion 20 of the lathe bed 10 to move the specimen 3 beneath the sensor head 61. As the miniature precision bearing 64 rolls along a path or linear track on the surface of the specimen 3 to scan the same such bearing and the rod 67 will undergo two types of vertical movement, with the pivot arm 66 undergoing a corresponding pivotal movement about the bearing 69. One of such vertical movements is a relatively gradual one as the miniature precision bearing 64 follows the gradual undulations in the surface of the specimen 3 due to thickness variations; usually there will be several, say three, such gradual undulations due to variations in the thickness of the specimen. The other vertical movement will be a relatively sharp one as the miniature precision bearing 64 rolls over a specific perturbation in the surface of the specimen 3 caused, for example, by one particle or several agglomerated particles of carbon black in a carbon black-reinforced rubber specimen.

Electrical transducer signals representing such vertical movements are developed by the linear variable differential transformer 62 and are conveyed by leads 7 and cable 63 to the electrical circuitry 6 for analysis thereby. Thus, as the motor 23 moves the upper table portion 20, the transducer 2 will scan the specimen 3 over a linear path. By adjusting the spacing between the light souces 27, 28 in the opto-electronic assembly 25, the length of each scan path or scan line can be set. For example, with reference to FIG. 2, assuming the motor 23 is moving the upper table portion 20 to the left, when the light source 28 is sensed by the photosensitive detector 26, the latter delivers an electrical signal to the electrical circuitry 6 to stop the motor, thus completing a scan line. Thereafter, the wheel 17 may be turned to move the specimen 3 beneath the sensor head 61 to another location for the next linear scan of the specimen with the motor 23 then rotating in an opposite direction until light source 27 is detected by the photosensitive detector 26 upon completion of the subsequent scan line and the electrical circuitry 6 again stops the motor 23. In this manner data in the form of transducer signals can be obtained by the analyzer 1 concerning surface perturbations of the specimen 3 representing, for example, carbon black dispersion therein, and the electrical circuitry 6 can analyze such data and produce output information indicative of such carbon black dispersion, as will be described further below with reference particularly to the schematic electric circuit diagram of FIG. 5.

The motor 23 is controlled by the electrical circuitry 6 to effect such scanning while transducer signals are developed by the transducer 2 to obtain, for example, simultaneous read-out of information concerning the surface characteristics of the specimen 3 on a meter 100, digital display 101, and graph 102 (FIG. 1). The electrical circuitry 6 is contained in a cabinet 103 (FIG. 1) having a face plate 104 on which are mounted the meter 100 and digital display 101. Also mounted on the face plate 104 is a main power on-off switch 105, a motor power on-off switch 106, a directional control switch 107, a power indicator pilot lamp 108, a reset switch 110, integrator operating indicator pilot lamp 111, and an integrator holding indicator pilot lamp 112. Leads 113 couple signals from the electrical circuitry 6 to a conventional strip chart recorder 114 which makes the graph 102 on chart paper 115.

Operation of the analyzer 1 is controlled by the electrical circuitry 6 illustrated in FIG. 5. The electrical circuitry 6 includes a power circuit 120, which supplies electrical power to the various portions of the tester 1, a control circuit 121, which controls movement of the upper table portion 20 and measurement of the transducer signal received on leads 7 and cable 63 from the transducer 2, and a measuring circuit 122, which measures and effects display of information concerning the surface characteristics of the specimen 3.

The power circuit 120 receives input electrical power, such as 115 volts AC, on lines 123. A grounded plug 124 couples such AC power through the power switch 105 to several integrated circuit regulated DC voltage power supplies 125, 126, 127. A circuit ground 128 is provided at the plug 124. The pilot lamp 108 is coupled across the power lines 129, 130 to provide a visual indication that power is on to the electrical circuitry 6 whenever the power switch 105 is closed.

The supply 125, which may be an Acopian Model 6F40, is energized through a fuse 131 and produces at its output terminals 132, 133 +6 volts DC and −6 volts DC relative to the ground 128. The signals on line 132, 133 are coupled to energize the transducer 62. The supply 126, which may be an Acopian Model 12US, is energized through a fuse 134 to produce at its output terminal 135 a +12 volts DC relative to the circuit ground 128. The terminal 135 is coupled to similarly labeled terminals throughout the electrical circuitry for energizing various circuits as shown. The supply 127, which may be an Analog Device Model 902, also is energized via the fuse 134 to produce at its output terminals 136, 137 +15 volts DC and −15 volts DC relative to the ground 128 as a power supply for the several amplifiers illustrated in the electrical circuitry 6. An AC transformer 138 also energized via the fuse 134 has its secondary leads 139, 140 coupled to energize the light sources 27, 28.

A further voltage regulator 141 receives the 12 volt signal from line 135 through a resistor 142. The regulator 141 includes a transistor 143, which provides a DC voltage at its collector output terminal 144; that voltage varies according to the adjustment of a potentiometer 145 connected to the resistor 142 in a resistance divider circuit 146. A diode 147 couples the emitter of transistor 143 to the ground 128, and a capacitor 148 coupled to the collector maintains the voltage at line 144 substantially constant when electrical noise may briefly affect conduction in the transistor 143. The regulated voltage on line 144 is supplied to integrated circuits 149, 150 in the control circuit 121, as will be described below.

The control circuit 121 responds to control signals produced by the photosensitive detector 26 in response to the respective light sources 27, 28 illuminating the former. A plug 151 couples the lines 139, 140 to energize the light sources 27, 28. The plug 151 also connects the photosensitive detector 26 in series with a resistor 152. The voltage across lines 136, 137 is applied to such series circuit to provide at a junction 153 a control signal that indicates whether or not light from a light source is impinging on the detector 26. An amplifier 154 including conventional feed-back circuitry 156 and offset adjusting potentiometer 157 amplifies the control signal to produce at junction 155 an amplified control signal.

At the start of operation of the specimen analyzer 1 from the position shown in FIG. 2, for example, assuming that the power switch 105 is closed and that the Q outputs 159, 160 of the J-K flip-flop integrated circuits 149, 150 are at logic 0 signal levels, upon closing the motor control switch 106 the motor 23 will be energized to commence driving the upper table portion 20 to the left. Power is delivered to the motor 23 through a closed relay switch 161-1, which is controlled by a motor control relay 161, and through the directional control switch 107, which has its switch arm 162 manually thrown to engage contact 162-L (for motion in the left hand direction) and its switch arm 163 coupled to the circuit ground 128. Both contacts 162-L and 162-R are connected by lines 164-L, 164-R for energizing the motor to move the upper table portion 20 in respective left and right directions, depending on connection of the switch arm 162. A capacitor 165 is connected across the lines 164-L, 164-R.

As the energized motor 23 moves the upper table portion 20 in a left hand direction, the light source 27 will align with and illuminate the detector 26, whereupon an amplified control signal is produced at the junction 155 causing the flip-flop 149 to toggle producing a logic 1 signal at its Q output 159. The logic 1 signal on line 159 enables the flip-flop 150 for toggling upon receipt of the next amplified control signal at junction 155. Moreover, the logic 1 signal on line 159 effects conduction in the integrating control transistor 170, which energizes a relay 171 to close relay switches 171-1 and 171-2 to start an integration cycle in the measuring circuit 122.

Turning now to the measuring circuit 122, the LVDT 62 is energized by a signal provided on lines 132, 133, and the transducer signal representing the position of the sensor head 61 is transferred via lines 180, 181, plug 182, leads 7 and cable 63, and plug 183 to the measuring circuit. The transducer signal is applied via leads 184, 185 across a resistor 186, and possibly through a voltage dropping divide by 2 resistor 187, depending on whether switch 188 is open or closed, to a meter circuit 189, which includes the meter 100. The meter 100 primarily is used to display information concerning the position of the sensor head 61 in order to assure that the latter is in proper position normal to the specimen 3 at the start of a testing cycle during which multiple linear scans of the specimen will be made.

The full or attenuated transducer signal, depending on whether switch 188 is open or closed, is applied via line 190 to a high band pass filter 191, which effectively blocks very slow variations in the transducer signal due, for example, to gradual undulations in the surface of the specimen 3 as a result of changes in thickness thereof, and very fast variations usually due to noise. The high band pass filter 191 includes a DC blocking capacitor 192 at its input and a further pair of capacitors 193, 194, resistors 195, 196, integrated circuit amplifier 197, and offset adjusting potentiometer 198. The parameters of these components of the filter 191 are selected and/or adjusted to a desired level so that the filter transducer signal at the output 199 of the filter will represent a desired type of information concerning the specimen. Preferably the filtered transducer signal produced at junction 200 coupled to the output 199 will be in the form of a plurality of pulses that vary in magnitude according to the height of a perturbation in the surface of the specimen 3 due to, for example, carbon black therein and in width according to the length of the perturbation in the plane of the specimen. The filtered transducer signal is coupled via resistors 201, 202 and a plug 203 to the leads 113 for delivery to the strip chart recorder 114. The graph 102 illustrated, for example, in FIG. 1, is characteristic of a typical wave form of the filtered transducer signal.

To obtain a quantitative representation of the surface characteristics, which represent carbon black dispersion, for example, of the specimen 3, the filtered transducer signal at junction 200 is converted to a DC signal value by a conditioning circuit 204, and that DC signal value is integrated over a period of time, for example, during which a complete linear scanning of the specimen 3 occurs over a track length determined by boundaries defined by the light surces 27, 28. A conventional digital voltmeter 205 measures the integrated DC signal value and displays that quantified information in the digital display 101.

The conditioning circuit 204 includes an input amplifier 207, a precision rectifier 208 that produces a full wave rectified signal, and an output amplifier 209, all of which are conventional circuits that operate in conventional manner. The DC signal value produced by the conditioning circuit 204 is provided at the output line 210 of the output amplifier 209. Line 210 is coupled to a contact 211 of the relay switch 171-1, which may be closed by energizing the relay 171 to commence an integrating period.

Assuming in the operational example described above that the light source 27 has just passed the detector 26 and the integration control relay 171 becomes energized, the DC signal value from line 210 is coupled via the relay switch 171-1, input potentiometer 212 and resistor 213 to the input of the integrator 214. The integrator is a conventional one including an integrated circuit amplifier 215, integrating capacitor 216, offset adjusting potentiometer 217, and output terminal 218 at which an integrated DC value is produced relative to terminal 219, which is connected to the circuit ground 128. Upon energization of the relay 171, the relay switch 171-2 also is operated to coupled a source of voltage from line 135 to energize the integrator operating indicating pilot lamp 111, integrator holding indicating pilot lamp 112, and integrator enabling relay 220. The energized relay 220 throws its relay switches 220-1 and 220-2; the former opens a discharge circuit across the capacitor 216 permitting a signal to be integrated thereby, and the latter provides a holding circuit to maintain the relay 220 energized even after the relay 171 has been deenergized. While the DC signal value is integrated by the integrator 214, the integrated DC signal value produced by the latter is measured by the digital volmeter 205 and is displayed in the digital display 101 as a quantitative representation of the carbon black dispersion in the specimen 3.

The just-described testing of the specimen 3 will continue automatically with the motor 23 moving the upper table portion 20 and the transducer 2 and with the measuring circuit 122 measuring the carbon black dispersion until the light source 28 aligns with the detector 26 causing both flip-flops 149, 150 to toggle. A capacitor 221 at the Q output 159 of the flip-flop 149 holds the signal at such output at a high level for a satisfactory duration to maintain the flip-flop 150 enabled to toggle, thereby producing a logic 1 signal at its Q output 160. The logic 1 signal at output 160 commences a sequence of events that subsequently deenergizes the motor 23 to stop motion of the upper table portion 20, as will be described below.

The logic 0 signal at Q output 159 of flip-flop 149 deenergizes the integrating control transistor 170 and relay 171, whereupon the relay switches 171-1 and 171-2 revert to the position illustrated in FIG. 5. Integration then stops, and due to the blocking effect of a diode 222 the pilot lamp 111 is extinguished; however, the relay 220 remains energized through reset switch 110 and the integrated DC signal value at the output terminal 218 is held for continued display.

With the divide by two resistor 187 short circuited by switch 188, the full transducer signal is received in the measuring circuit 122 and a single pass of the scanning head 61 across the specimen ordinarily will be adequate to measure surface characteristics thereof. However, with the switch 188 open and resistor 187 in circuit, the specimen will be scanned ordinarily in both left and right directions by the scanning head 61, for example conveniently to verify the accuracy of the information obtained.

It is desirable to continue motion of the specimen 3 a small distance path the boundaries set by respective light sources 27, 28 at the end of each scan. Such continuation of motion places the transducer in a location such that upon commencing the next scan a boundary has to be crossed so that the photosensitive detector 26 will produce a control signal that will restart integration in another scan cycle of tester 1 operation, as described above.

The high signal value produced at the Q output 160 of flip-flop 150 at the end of a scan, then, effects conduction in a motion stopping transistor 230 to energize a motion stopping relay 231, which opens a relay switch 231-1. The relay switch 231-1 is connected across a capacitor 232 of a relaxation oscillator timing circuit 233. Upon opening of the relay switch 231-1, the capacitor 232 commences charging at a rate determined by an adjustable potentiometer 234, while the motor 23 continues to move the specimen so that the scan head 61 passes the end of scan boundary. When the voltage across the capacitor 232 exceeds the break down voltage of a unijunction transistor 235, the latter conducts to discharge the capacitor 232 in conventional manner. The discharging capacitor 232 provides a gate signal to the gate electrode 236 of an SCR 237, which then becomes conductive to energize the motor control relay 161. The energized relay 161 open its relay switch 161-1 to cut off power for the motor 23 promptly stopping the same and the motion of the upper table portion 20.

As soon as the SCR 237 fires, it couples the DC terminal of flip-flop 150 via a diode 240 to the circuit ground 128. This coupling effectively resets the flip-flop 150 so that the Q output 160 becomes logic 0 to deenergize the relay 231 which disables the timing circuit 233 to remove the gate signal from the SCR 237. The SCR 237, however, will remain conductive to keep the motor control relay 161 energized until the direction control switch 107 is thrown to its opposite stable position. As the switch arm 163 is thrown, the circuit path for the SCR 237 to the ground 128 is briefly opened thereby cutting off the SCR 237 and deenergizing the motor control relay 161. With the relay switch 161-1 closed the motor will be energized to move the upper table portion 20 in the right hand direction when the switch arm 162 engages the contact 162-R.

Referring back to the measuring circuit 122, the reset circuit 122, the reset switch 110 may be manually operated effectively to discharge the capacitor 216 of the integrator 214 whenever the integrator is in a holding mode with the relay 171 deenergized such that the relay switches 171-1 and 171-2 are in the positions shown in FIG. 5. Operating the reset switch 110 during the holding mode cuts off the source of power for the integrator enabling relay 220 deenergizing the same. The relay switches 220-1 and 220-2 then revert to the portions shown in FIG. 5. The relay switch 220-1 discharges the capacitor 216 so that the integrated DC signal value at terminal 218 becomes zero and is displayed as such by the digital volmeter 205 on the digital display 101. The open circuit provided at the reset switch 110 also cuts off a source of power otherwise provided viza terminal 241 to a reset relay 242 in the control circuit 121. The deenergized reset relay 242 opens its relay switch 242-1 to effect a resetting of the flip-flop 149 which then produces a logic 0 signal at its Q output 159. The analyzer 1 is then ready for operation again to scan the specimen 3, for example, as the motor 23 moves the upper table portion in a right direction, preferably after the wheel 17 has been manually turned to move a different portion of the specimen 3 into position beneath the sensor head 61. Alternatively, the next and further subsequent scans of the specimen may be effected without having reset the integrator 214. In either event, that is, whether or not the integrator 214 is reset between scans, as the motor moves the next light source into alignment with the photosensitive detector 26, the above-described operation will be repeated to obtain the desired quantative and/or graphical information concerning carbon black dispersion in the specimen 3.

In view of the foregoing, it will be appreciated that the analytical apparatus 1 of the invention may be used to obtain valuable information about a specimen by direct continuous examination of the surface characteristics thereof.

I claim:

1. Apparatus for measuring surface characteristics of a specimen, comprising: support means for supporting a specimen, said support means including means for stretching such specimen; transducer means for directly mechanically engaging such specimen to produce a transducer signal indicating the surface characteristic of discrete surface portions of such specimen; motion means for effecting relative movement between said support means and said transducer means to scan the latter on the surface of such specimen; and output means for analyzing such transducer signal to produce output information representing surface characteristics of a scanned portion of such specimen.

2. The apparatus of claim 1, said support means comprising a miniature lathe bed.

3. The apparatus of claim 2, said motion means comprising electric motor means for moving a portion of said lathe bed in at least one linear direction.

4. The apparatus of claim 3, further comprising control circuit means for automatically controlling energization of said motor means to effect such relative movement.

5. The apparatus of claim 4, wherein said motion means effects such relative movement to obtain a substantially linear scanning of such specimen by said transducer means, and said control circuit means including photosensitive means for defining approximate end boundaries between which such scanning occurs.

6. The apparatus of claim 1, said means for stretching comprising clamp means for clamping such specimen to said support means.

7. The apparatus of claim 6, said clamp means including a pivot clamp consisting a clamping bar and screw means for pivoting said clamping bar into clamping engagement with such specimen.

8. The apparatus of claim 6, said support means comprising a plural part platen, one of which is movable with respect to the other, said clamp means for clamping such specimen to both parts of said platen, and further comprising means for forcibly separating the parts of said platen thereby to stretch such specimen.

9. The apparatus of claim 8, further comprising indicator means connected to one of the parts of said platen to move therewith for indicating the amount of stretching of such specimen.

10. The apparatus of claim 1, said transducer means comprising a linear variable differential transformer.

11. The apparatus of claim 1, said transducer means comprising a rolling bearing and bearing support means for supporting said bearing in direct mechanical engagement with such specimen.

12. The apparatus of claim 11, said rolling bearing comprising a miniature precision bearing.

13. The apparatus of claim 11, said bearing support means comprising counterweight means for substantially offsetting the weight of said transducer relative to such specimen thereby to obtain a relatively small force of engagement between said bearing and such specimen.

14. The apparatus of claim 1, said motion means comprising a synchronous electric motor.

15. The apparatus of claim 14, said motion means further comprising a transmission means for coupling a mechanical output from said motor to said support means to effect moving of the latter with respect to said transducer means.

16. The apparatus of claim 14, said support means comprising a base, a table movable in two directions relative to said base, stand means for supporting said transducer means, means for securing such specimen in fixed position relative to said table for movement therewith, and means for coupling said motor to effect controlled movement of said table.

17. The apparatus of claim 16, further comprising direction changing means for changing the direction of mechanical output of said motor to reverse the direction of motion of said table.

18. The apparatus of claim 17, further comprising control means for limiting the length of travel of said table by said motor.

19. The apparatus of claim 18, said control means comprising photosensitive means for sensing movement of said table to an end limit of travel thereof.

20. The apparatus of claim 1, said output means comprising recorder means for producing such output information in recorded graphical form.

21. The apparatus of claim 1, said output means comprising filter means for filtering such transducer signal to produce such output information indicative of specified characteristics of such specimen, and measuring means for measuring the output of said filter means.

22. The apparatus of claim 1, said output means comprising integrator means for integrating such transducer signal with respect to time.

23. The apparatus of claim 22, said motion means comprising motor means for effecting such relative movement between said support means and said transducer means to obtain a scanning of such specimen by said transducer means along a predetermined path, and further comprising means for establishing boundaries at opposite ends of such path.

24. The apparatus of claim 23, further comprising control means for controlling said integrator means to commence integrating such transducer signal when such scanning commences at one of such boundaries and for stopping such integration when the other of said boundaries is passed during such scanning.

25. The apparatus of claim 1, said motion means comprising motor means for effecting such relative movement between said support means and said transducer means to obtain a scanning of such specimen by said transducer means along a predetermined path, and further comprising means for establishing boundaries at opposite ends of such path.

26. Apparatus for measuring surface characteristics of a specimen, comprising: support means for supporting a specimen; transducer means for directly mechanically engaging such specimen to produce a transducer signal indicating the surface characteristic of discrete surface portions of such specimen, said transducer means including a rolling bearing and bearing support means for supporting said bearing in direct mechanical engagement with such specimen; adjustable means for adjustably positioning said bearing and said bearing support means substantially normal to the surface of such specimen; motion means for effecting relative movement between said support means and said transducer means to scan the latter on the surface of such specimen; and output means for analyzing such transducer signal to produce output information representing surface characteristics of a scanned portion of such specimen.

27. The apparatus of claim 26, said transducer means further comprising a linear variable differential transformer, and shaft means for coupling information indicative of the relative position of said bearing to a movable portion of said transformer, and wherein said adjustable means comprises means for positioning the axial extent of said shaft means in substantially perpendicular relation to the surface of such specimen.

28. The apparatus of claims 26 or 15, further comprising meter means for indicating such normal alignment of said bearing relative to such specimen.

29. The apparatus of claim 26, further comprising lock means for locking said adjustable means in relatively fixed position.

30. Apparatus for measuring surface characteristics of a specimen, comprising: support means for supporting a specimen; transducer means for directly mechanically engaging such specimen to produce a transducer signal indicating the surface characteristic of discrete surface portions of such specimen; motion means for effecting relative movement between said support means and said transducer means to scan the latter on the surface of such specimen; and output means for analyzing such transducer signal to produce output information representing surface characteristics of a scanned portion of such specimen, said output means including filter means for filtering such transducer signal to produce such output information indicative of specified characteristics of such specimen, measuring means for measuring the output of said filter means, and said filter means including a high band pass filter means for deriving output information measured by said measuring means indicative of carbon black dispersion in such specimen.

31. Apparatus for measuring surface characteristics of a specimen, comprising: support means for supporting a specimen; transducer means for directly mechanically engaging such specimen to produce a transducer signal indicating the surface characteristic of discrete surface portions of such specimen; motion means for effecting relative movement between said support means and said transducer means to scan the latter on the surface of such specimen, said motion means comprising motor means for effecting such relative movement between said support means and said transducer means to obtain a scanning of such specimen by said transducer means along a predetermined path; means for establishing boundaries at opposite ends of such path; output means for analyzing such transducer signal to produce output information representing surface characteristics of a scanned portion of such specimen, said output means comprising integrator means for integrating such transducer signal with respect to time; and control means for controlling said integrator means to commence integrating such transducer signal when such scanning commences at one of such boundaries and for stopping such integration when the other of such boundaries is passed during such scanning; said integrator means including holding means for holding a signal value achieved thereby after a scan of such specimen has been completed to the latter boundary.

32. The apparatus of claim 31, further comprising reset means for resetting said integrator means to a predetermined signal value when said integrator means is holding such signal value and is not operatively integrating such transducer signal.

33. The apparatus of claims 31 or 32, further comprising means for measuring and displaying the integrated signal value produced by said integrator means as an indication of such surface characteristics.

34. Apparatus for measuring surface characteristics of a specimen, comprising: support means for supporting a specimen; transducer means for directly mechanically engaging such specimen to produce a transducer signal indicating the surface characteristic of discrete surface portions of such specimen; motion means for effecting relative movement between said support means and said transducer means to scan the latter on the surface of such specimen; and output means for analyzing such transducer signal to produce output information representing surface characteristics of a scanned portion of such specimen, said output means comprising integrator means for integrating such transducer signal with respect to time, amplifier means for amplifying such transducer signal to provide an amplified transducer signal, filter means for filtering such amplified transducer signal to produce a filtered transducer signal indicative of a specified type of surface characteristic information of such specimen, and precision rectifier means for rectifying such filtered transducer signal, said rectifier means being coupled to provide such transducer signal to said integrator means.

35. Apparatus for measuring surface characteristics of a specimen, comprising: support means for supporting a specimen; transducer means for directly mechanically engaging such specimen to produce a transducer signal indicating the surface characteristic of discrete surface portions of such specimen; motion means for effecting relative movement between said support means and said transducer means to scan the latter on the surface of such specimen, said motion means comprising motor means for effecting such relative movement between said support means and said transducer means to obtain a scanning of such specimen by said transducer means along a predetermined path; means for establishing boundaries at opposite ends of such path; output means for analyzing such transducer signal to produce output information representing surface characteristics of a scanned portion of such specimen, said output means comprising integrator means for integrating such transducer signal with respect to time; and control means for controlling said integrator means to commence integrating such transducer signal when such scanning commences at one of such boundaries and for stopping such integration when the other of such boundaries is passed during such scanning; and further comprising additional control means for indicating when said motion means effects scanning of such specimen beyond such respective boundaries.

36. Apparatus for measuring surface characteristics of a specimen, comprising: support means for supporting a specimen; transducer means for directly mechanically engaging such specimen to produce a transducer signal indicating the surface characteristic of discrete surface portions of such specimen; motion means for effecting relative movement between said support means and said transducer means to scan the latter on the surface of such specimen, said motion means comprising motor means for effecting such relative movement between said support means and said transducer means to obtain a scanning of such specimen by said transducer means along a predetermined path; means for establishing boundaries at opposite ends of such path; output means for analyzing such transducer signal to produce output information representing surface characteristics of a scanned portion of such specimen, said output means comprising integrator means for integrating such transducer signal with respect to time; and control means for controlling said integrator means to commence integrating such transducer signal when such scanning commences at one of such boundaries and for stopping such integration when the other of such boundaries is passed during such scanning; and further comprising continuing means for continuing operation of said motion means for a predetermined amount to effect relative movement to bring said transducer means past such respective boundaries.

37. Apparatus for measuring surface characteristics of a specimen, comprising: support means for supporting a specimen; transducer means for directly mechanically engaging such specimen to produce a transducer signal indicating the surface characteristic of discrete surface portions of such specimen; motion means for effecting relative movement between said support means and said transducer means to scan the latter on the surface of such specimen, said motion means including motor means for effecting such relative movement between said support means and said transducer means to obtain a scanning of such specimen by said transducer means along a predetermined path; means for establishing boundaries at opposite ends of such path; continuing means for continuing operation of said motion means for a predetermined amount to effect relative movement to bring said transducer means past such respective boundaries; and output means for analyzing such transducer signal to produce output information representing surface characteristics of a scanned portion of such specimen.

38. The apparatus of claim 36 or 37, further comprising direction changing means for changing the direction of such relative movement effected by said motion means, means for stopping said motion means to prevent further relative movement after a respective boundary has been passed and motion has been continued for such predetermined amount, and wherein said direction changing means includes reset means for resetting said stopping means.

39. The apparatus of claim 38, said continuing means comprising a relaxation oscillator.

40. Apparatus for measuring surface characteristics of a specimen, comprising: support means for supporting a specimen; transducer means for directly mechanically engaging such specimen to produce a transducer signal indicating the surface characteristic of discrete surface portions of such specimen; motion means for effecting relative movement between said support means and said transducer means to scan the latter on the surface of such specimen; output means for analyzing such transducer signal to produce output information representing surface characteristics of a scanned portion of such specimen; and selectively operable control means for causing said motion means to effect such relative motion to enable scanning of substantially the same part of such specimen in two directions, and said output means including means operable when such two direction scanning is desired for selectively dividing such transducer signal by two.

41. A method of testing surface characteristics of a specimen comprising: placing a transducer into engagement with the surface of such specimen, effecting relative movement between such transducer and such specimen to effect scanning of the latter by the former, converting motion of such transducer caused by perturbations in the surface of such specimen into information indicative of the surface characteristics of such specimen, said converting including producing an electrical signal indicative of such perturbations and integrating a signal with respect to time while such scanning occurs in a controlled manner, and defining boundaries over which such scanning is effected and said step of integrating including integrating such signal while such scanning is occurring between such boundaries.

42. A method of testing surface characteristics of a specimen comprising: placing a transducer into engagement with the surface of such specimen, effecting relative movement between such transducer and such specimen to effect scanning of the latter by the former, converting motion of such transducer caused by perturbations in the surface of such specimen into information indicative of the surface characteristics of such specimen, and stretching such specimen to accentuate surface perturbations therein.

43. The method of claim 42, said converting comprising producing an electrical signal indicative of such perturbations.

44. The method of claim 43, said converting further comprising integrating a signal with respect to time while such scanning occurs in a controlled manner.

45. The method of claim 41 or 42, further comprising filtering such signals to obtain information concerning only specified characteristics of such specimen.

46. A method of testing surface characteristics of a specimen comprising: placing a transducer into engagement with the surface of such specimen, effecting relative movement between such transducer and such specimen to effect scanning in two directions of the latter by the former, converting motion of such transducer caused by perturbations in the surface of such specimen into information indicative of the surface characteristics of such specimen, such transducer producing a transducer signal indicative of such perturbations, and dividing the signal produced by such transducer by two.

* * * * *